(No Model.)
J. C. ANDERSON.
MANUFACTURE OF DRAIN OR IRRIGATING TILES.
No. 351,615. Patented Oct. 26, 1886.
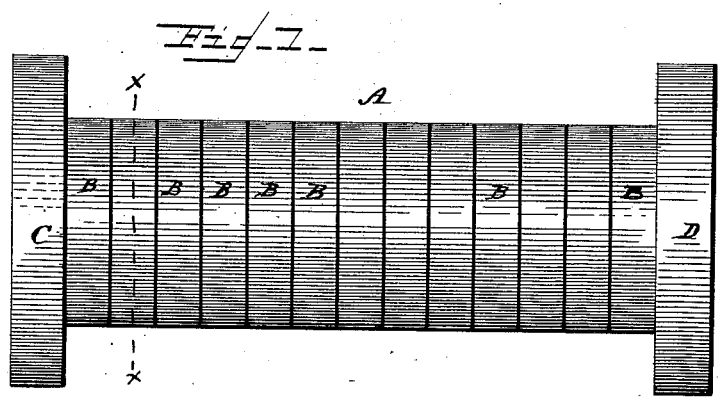
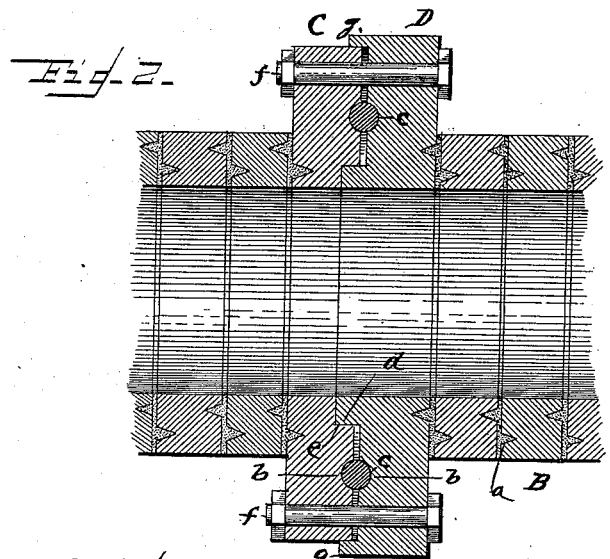
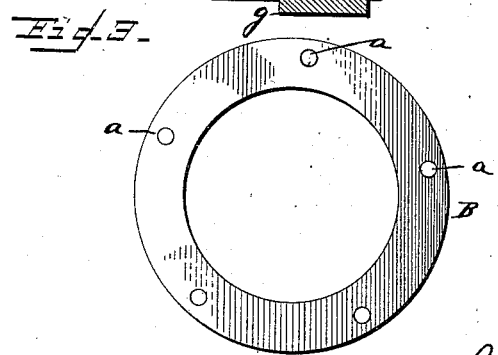
Witnesses
Edwin L. Yewell,
Inventor
J. C. Anderson
By his Attorney

UNITED STATES PATENT OFFICE.

JAMES C. ANDERSON, OF HIGHLAND PARK, ILLINOIS.

MANUFACTURE OF DRAIN OR IRRIGATING TILES.

SPECIFICATION forming part of Letters Patent No. 351,615, dated October 26, 1886.

Application filed June 16, 1886. Serial No. 205,338. (No model.)

*To all whom it may concern:*

Be it known that I, JAMES C. ANDERSON, a citizen of the United States, residing at Highland Park, in the county of Lake, State of Illinois, have invented certain new and useful Improvements in the Manufacture of Drain or Irrigating Tiles, of which the following is a specification, reference being had therein to the accompanying drawings.

My invention relates to the manufacture of drain tiles or pipes for the conveyance of water, steam, gas, oil, and other material, from clay.

The object of my invention is to provide a pipe, for the conveyance of water, steam, gas, oil, or other material, from dry clay, which will withstand heavy pressure and will not deteriorate or permit the material conveyed therethrough to escape.

In the conveyance of water for irrigating and city supply purposes great pressures are almost invariably exerted, and the iron pipes which have heretofore been used will not stand any great length of time, owing to the oxidizing effect of the water and the moisture from the ground, which soon renders them leaky and unfit for use; and, furthermore, it is not practical to use cast-iron pipes for the conveyance of natural gas under great pressure for the reason that such pipes are more or less porous, and permit the gas to escape, not only entailing loss to the users, but great damage to life and property from explosions. Pipes and tiles made from wet clay by the usual well-known processes are more or less porous and fragile, and not adapted to stand the pressure required in the conveyance of liquid, steam, or gas.

My invention consists in making the pipes or conduits in short sections of dry-clay powder under great pressure, so as to produce a solid and dense body, and joining these short sections into one body by means of a vitrifiable cement or substance, so as to produce sections of any convenient or desirable length.

Referring to the drawings, Figure 1 is a side elevation of one of my improved sections of pipe. Fig. 2 is a sectional view of the two adjacent or connecting pipes. Fig. 3 is a sectional view on the line *x x*, Fig. 1.

Dry-clay powder cannot be compressed in large bodies to any great degree of density, but when pressed in small quantities into thin or comparatively thin articles an exceedingly high degree of density and strength is imparted to them, so that the article is not liable to be broken, and is capable of withstanding great pressure.

A indicates a section of the pipe, which may be of any desired diameter, said sections being made up of a series of thin sections or rings, B, the larger sections, C and D, being secured at each end of the smaller portion, so as to afford means by which the sections A may be joined together.

As before intimated, the sections which form the pipes or conduits are made from dry-clay powder under great pressure, which thoroughly compacts or solidifies the clay, so that the size and number of the pores are reduced to the minimum and the strength of the tile or pipe increased, as against the ordinary clay or terracotta tile or conduit, and renders the same capable of withstanding great pressures. The ends of the small tile or sections which constitute the main body of the tile are provided with cavities *a*, which may be cone shaped, as shown, or of any other suitable form best adapted to receive and hold the vitrifiable material by which the sections are joined together, or annular depressions may be made in the ends of the small sections to receive the vitrifiable material, and in this manner a dense body is formed, which will withstand great pressure from within and from without. The end sections, C and D, are made larger than the sections B, and are provided with an annular groove or recess, *b*, in which is placed a rope or ring of asbestus fiber, *c*, or other suitable packing material, which will make a perfectly tight joint. The section D is provided with an annular projection, *d*, which enters an annular cavity, *e*, in the section C, whereby the sections A, when joined together by the bolts *f*, are prevented from moving in a lateral direction. The section D is somewhat larger than the section C, and is provided with an annular projection, *g*, which fits over the section C, and serves as a further security for making a tight and rigid joint.

In making up the sections A one of the end tiles or sections is placed in the kiln and a number of the intermediate tiles or wings B placed thereon until the desired length of the section has been reached, when the other end section is placed in position. It will be understood that a suitable vitrifiable material is placed between the sections, and the cavities *a* filled with the same as the sections are built up in the kiln, and, if desired, a suitable glaze may be applied to the inside and outside of the tiles. After the tiles are placed in position in sections in the kiln, as just indicated, they are fired until thoroughly burned and the vitrifiable material fused, so that the sections A will form one solid rigid body.

These pipes or conduits will be found specially useful for the conveyance of water for irrigating purposes, more particularly where the water or other liquid or gases is to be carried long distances and great pressure is exerted to force the liquid or gas to its destination.

As heretofore stated, these tiles are very dense and solid and capable of withstanding great pressure without leaking or fracture, and are not affected by thermal changes or disintegrated by the action of the frost, and preferable to iron, for the reason that they are not so expensive, and do not oxidize or rust out. For the conveyance of oil, as now practiced by pipe-lines, and the transportation of natural gas from the wells to the large cities where it is to be used, and also for the conveyance of steam in the various systems of heating cities, towns, &c., these pipes will be found to meet all the requirements.

Having described my invention, I claim—

1. A pipe or conduit for the conveyance of liquids, gas, or steam, composed of sections of clay tile, said sections being made up of smaller sections joined together by a vitreous or vitrifiable material under heat, as set forth.

2. A pipe or conduit for the conveyance of liquids, gas, or steam, composed of sections of clay tile, said sections being made up of small tiles, with larger tiles forming the ends of the same, the end tiles being provided with suitable means for connecting the sections together, as set forth.

In testimony whereof I affix my signature in presence of two witnesses.

JAMES C. ANDERSON.

Witnesses:
SAML. F. MILLER,
FRANK L. BLAKE.